United States Patent [19]

Kohler et al.

[11] Patent Number: 4,545,088
[45] Date of Patent: Oct. 8, 1985

[54] WINDSHIELD WIPER INSTALLATION

[75] Inventors: Alfred Kohler; Oldrich Krizek, both of Bietigheim-Bissingen, Fed. Rep. of Germany

[73] Assignee: ITT Industries, Inc., New York, N.Y.

[21] Appl. No.: 400,974

[22] Filed: Jul. 22, 1982

[30] Foreign Application Priority Data

Aug. 14, 1981 [DE] Fed. Rep. of Germany ....... 3132183

[51] Int. Cl.<sup>4</sup> ............................................. B60S 1/34
[52] U.S. Cl. ................. 15/250.35; 15/250.34
[58] Field of Search .......... 15/250.31, 250.34, 250.35, 15/250.16, 250.17, 250.19

[56] References Cited

U.S. PATENT DOCUMENTS

| 2,850,755 | 9/1958 | Deibel | 15/250.34 |
| 3,344,458 | 10/1967 | Deibel | 15/250.35 |
| 3,512,205 | 5/1970 | Reister et al. | 15/250.34 |
| 3,548,442 | 12/1970 | Stratton | 15/250.35 X |

FOREIGN PATENT DOCUMENTS

| 342845 | 8/1936 | Italy | 15/250.34 |
| 777094 | 6/1957 | United Kingdom | |

Primary Examiner—Peter Feldman
Attorney, Agent, or Firm—Donald J. Lenkszus

[57] ABSTRACT

A windshield wiper assembly includes a helical compression spring arranged laterally staggered relative to the wiper shaft in such a way that the center line of the helical compression spring runs alongside the wiper shaft. This permits the wiper arm to be made very compact and low, so that it can be used in motor vehicle windshield wiper installations having a concealed parking position.

12 Claims, 9 Drawing Figures

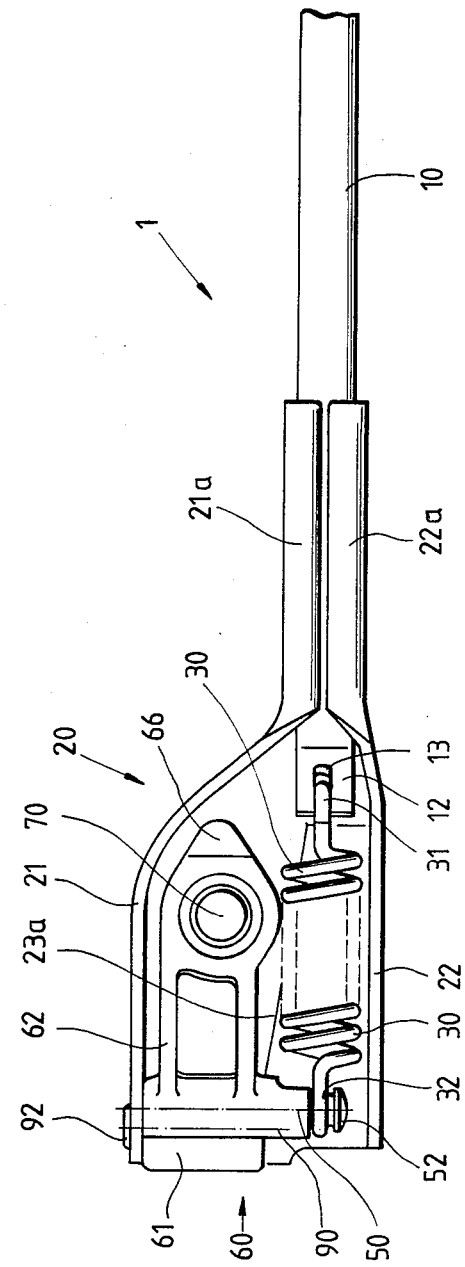

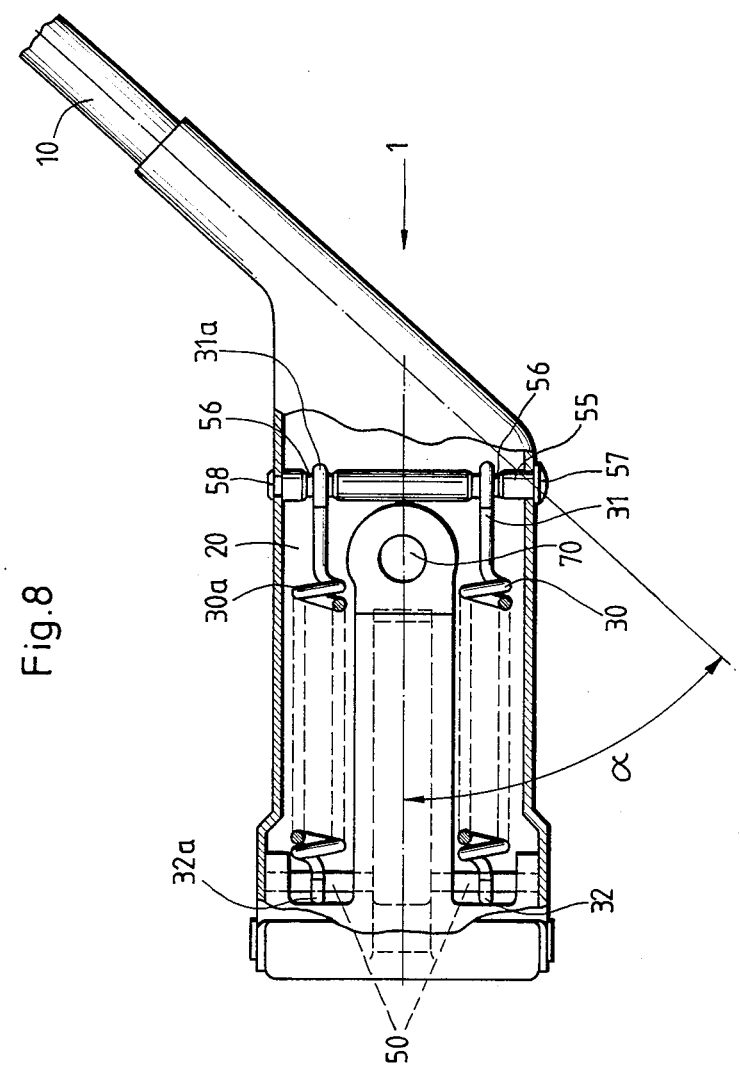

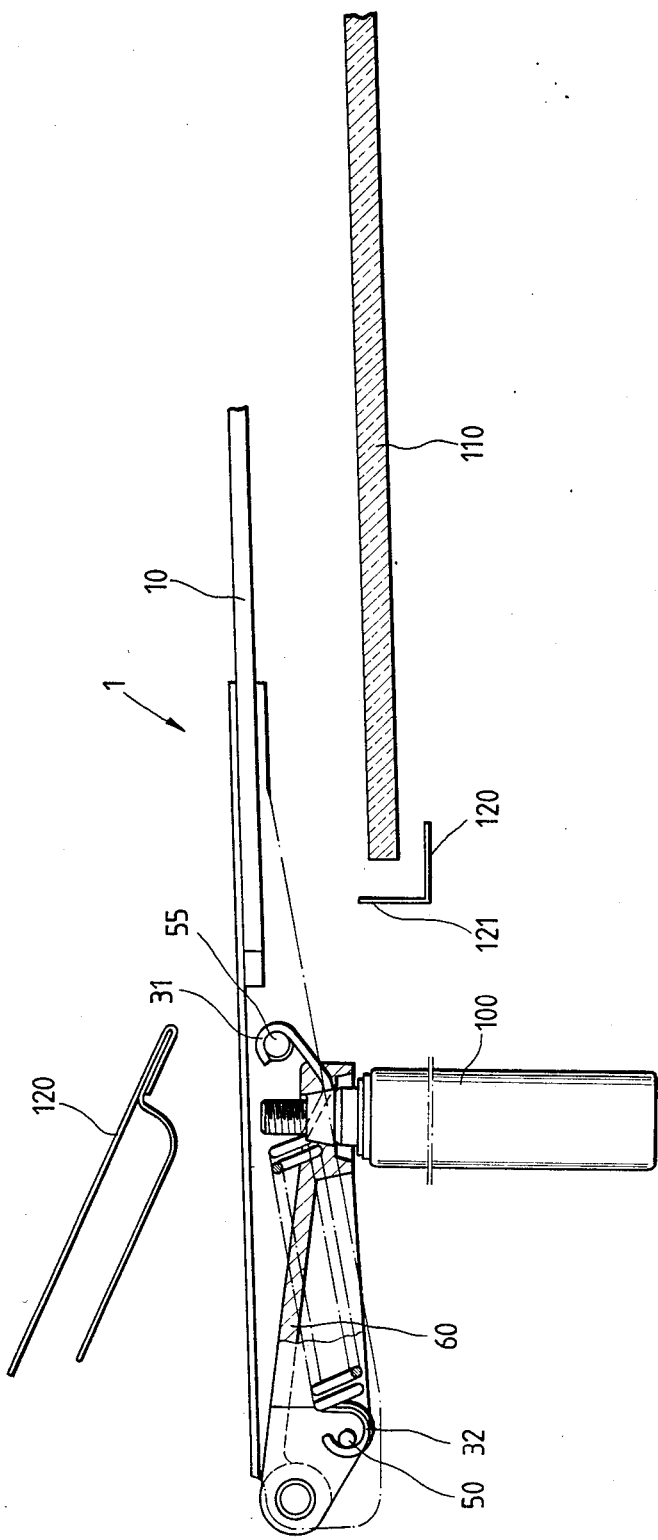

4,545,088

WINDSHIELD WIPER INSTALLATION

BACKGROUND OF THE INVENTION

This invention relates to a windshield wiper assembly. In prior windshield wiper assemblies such as that shown in German specification OS No. 2,052,354, a link is articulated to the front end of a fastening member facing the moving joint of the wiper blade. The fastening member is secured on a wiper shaft in a manner protected against twisting. A helical compression spring arranged within the link acts normally upon the wiper rod and also via a C-shaped yoke acts upon the fastening member.

For styling and safety, windshield wiper assemblies having a concealed parking position are provided. When these assemblies are not operated, the wiper arm and the wiper blade rest in a narrow opening of the vehicle body. For such installations, the wiper assembly should be compact; in particular, the wiper arm must have a small overall height.

It is difficult to provide a wiper assembly having a helical spring in an installation having a concealed parking position because the angle of inclination of the helical compression spring may not fall below a given value to ensure sufficiently great contact pressures of the wiper blade on the windshield.

In a windshield wiper installation according to the German specification OS No. 1,919,350 it has been attempted to achieve a smaller overall height of the wiper arm by using two springs and a U-shaped yoke conducted round the wiper shaft. It is necessary to use a guide arrangement for the yoke moved to and fro through the spring action. Because this part moves slidingly on a holding means which is fastened on the link by means of a rivet or the like, the connecting point and the holding means are subject to a considerable load and wear. Furthermore such an arrangement results in a relatively long wiper arm link, so that this windshield wiper installation is inappropriate for some vehicle models.

SUMMARY OF THE INVENTION

It is an object of the present invention to provide a windshield wiper installation which is suitable to be installed in a concealed parking position and which includes elements so compact that it can be used without any difficulties for vehicles of the most diverse designs.

In accordance with the principles of the invention a windshield wiper assembly includes a helical compression spring arranged laterally staggered relative to the wiper shaft in such a way that the center line of the helical compression spring runs along side the wiper shaft. This permits the wiper arm to be made very compact and low, so that it can be used in motor vehicle windshield wiper installations having a concealed parking position.

The fastening hooks of the helical compression spring or a connecting yoke extending in one line with the longitudinal axis of the compression spring and directly acting upon the compression spring and thus create a low and short wiper arm link.

In one embodiment of the invention the wiper shaft and helical compression spring can be arranged directly one beside the other so that the wiper shaft is completely outside of the working line of the spring. Thus the overall height can be diminished further and the link can be shortened, in particular when the spring acts upon the wiper arm and directly upon the fastening member.

By positioning the moving joint between wiper arm and wiper shaft entirely outside of the line formed by the wiper rod-link with the compression spring and the moving joint of the link. The wiper shaft does not disadvantageously affect the overall height of the wiper arm.

Further in accordance with an embodiment, the wiper shaft is positioned close to the front point of the support of the helical compression spring and thus the broader part of the wiper arm link can remain completely in the interior of a parking housing for the time the wiping cycles last. This has a favourable effect both on the driver's view conditions and on the aerodynamical conditions of the vehicle.

One feature of the invention is that the link covers the fastening member almost completely. This permits water to better run off the wiper arm which therefore is better protected against corrosion and looks more elegant.

In some vehicle models it can be of advantage, when the link is arranged in deviation from the longitudinal direction of the wiper rod at an angle to it. In order to ensure that the contact pressure is high enough, the center line of the link should not deviate substantially more than by an angle of 50° from the center line of the wiper rod. The link of the wiper arm developed in such a way needs less lateral space for the time the wiping cycle last than the versions described before.

BRIEF DESCRIPTION OF THE DRAWINGS

The invention may be better understood from a reading of the following detailed description in conjunction with the drawings in which:

FIG. 5 is a view of the open underside of a further wiper arm according to the invention;

FIG. 8 is a partial cross-sectional top view of another wiper arm according to the invention; and FIG. 9 shows the position of the wiper arm of FIG. 8 on the wiper shaft and in a vehicle body.

DETAILED DESCRIPTION

Figure 1:
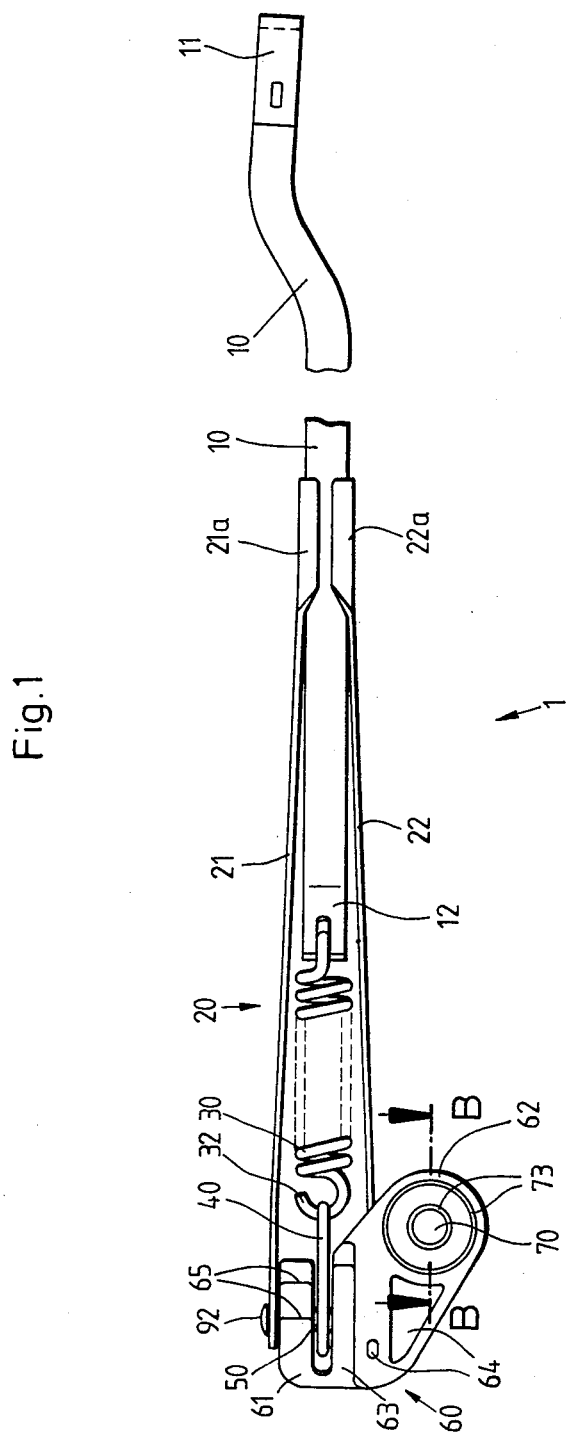
FIG. 1 is a view of the open underside of a wiper arm according to the invention.
Figure 2:
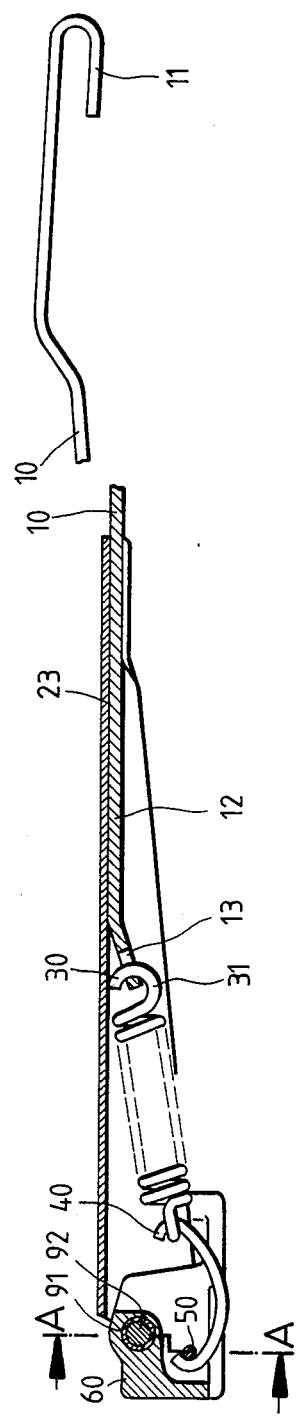
FIG. 2 is a cross-sectional side view of the wiper arm of FIG. 1.

The wiper arm 1 shown in FIGS. 1 and 2 consists of a wiper rod 10 formed from a steel band. One end 11 is bent like a hook towards a windshield (not shown in the drawing) and is adapted to provide an articulated connection with a wiper blade (not shown). The straight center portion of the wiper rod is not shown. The other end 12 of the wiper rod 10 is firmly connected with a link 20 which consists of a symmetric, hollow sheet steel member arranged alongside a line with the wiper rod 10 and open on one longitudinal side. This open longitudinal side is shown in the drawing (FIG. 1) and in the mounted condition is to be positioned directly opposite the windshield. It includes two side walls 21, 22 and a center portion 23 connecting the side walls. The proportions on the complete wiper arm are such that about half of the length of the link covers a quarter of the length of the wiper rod and embraces the wiper rod in a form-fit manner with two lugs 21a, 22a bent rectangularly from the side walls. The outer end of the link 20 is about twice as wide as the connecting point with the wiper rod 10 and receives a compression spring 30 developed as a helical spring which has two hook-shaped, bent ends 31, 32. The first hook 31 is approximately C-shaped and engages the rear portion 12 of the wiper rod 10 from below. End portion 12 is bent from the center portion 23 covering it and provided with a suspension opening 13. The second hook 32 is also C-shaped and relative to the first hook 31, is turned by a right angle and embraces a substantially C-shaped, oblong yoke 40 which is secured in a fastening member 60 via a suspension pin 50 developed as a fitting pin.

Figure 3:
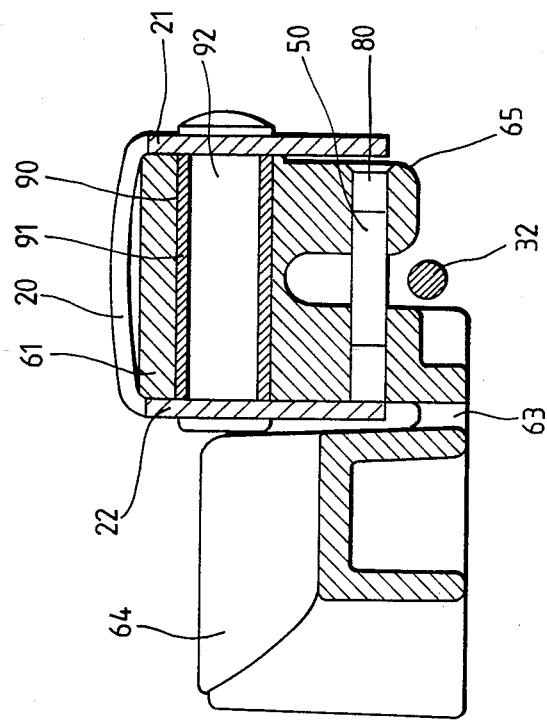
FIG. 3 is a section taken on the line A—A of FIG. 2 shown at an enlarged scale and turned by 90°.
Figure 4:
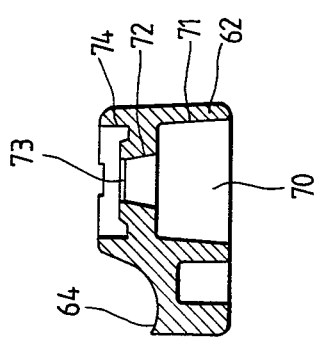
FIG. 4 is a section taken on the line B—B of FIG. 1.

FIGS. 3 and 4 show details of the fastening member 60 of the wiper arm 1 shown in FIGS. 1 and 2. The fastening member consists of a divided zinc-aluminum diecast part and includes a portion 61 partly covered by the link 20 and a lateral elongation 62 which is positioned outside the link 20. In the top view the lateral elongation 62 has approximately the shape of the U whose curvature is directed to the outside, with ends at about the level of the rear end of the helical spring 30 and is provided with a bore 70 for receiving a wiper shaft not shown in the drawing.

The portion 61 covered by the link 20 has two bores 80, 90, of which the bore 80 receives the suspension pin 50 for the helical compression spring 30. The other bore 90 is positioned above and in front of the bore 80 and is provided with a bushing 91. This is the moving joint for the link 20 which in this place is rotatably secured by means of a rivet 92. The two portions 61, 62 of the fastening member are interconnected through a web 63. As FIGS. 1, 3 and 4 in particular show, the lateral elongation 62 descends from the web 63 in the area of the articulated rivet 92 in the shape of a curvature 64 to about half of its height and thereafter rises for about the same distance as far as to the bore 70 for the wiper shaft 100. This makes the moving joint of the link 20 on the fastening member 60 easily accessible at any time, so that the entire wiper arm can be removed, if necessary. The portion 61 of the fastening member covered by the link 20 ends in steps 65 towards the center portion 23 of the link 20.

FIG. 4 shows the stepped bore 70 provided to receive the wiper shaft. After an almost straight portion 71 and a shoulder, this bore changes into a smaller tapered portion 72. After a flange 73 follows a bore 74 which has about the diameter of the straight portion 71 and serves for receiving a fastening means for the wiper shaft, for instance a nut.

It is particularly advantageous in this embodiment that the wiper shaft is arranged entirely outside of the wiper which consequently can be made much lower. Furthermore it is advantageous that the wiper arm can easily be manually tilted for changing the wiper blade or cleaning the windshield. The wiper arm is reliably held in the tilted position due to the C-shaped yoke. Moreover the wiper arm can be very easily mounted on the wiper shaft and removed again, if necessary.

Figure 7:
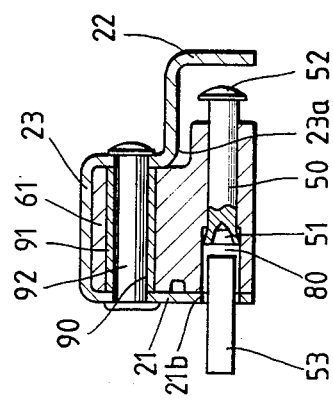
FIG. 7 is a section taken on the line C-D of FIG. 6.
Figure 6:
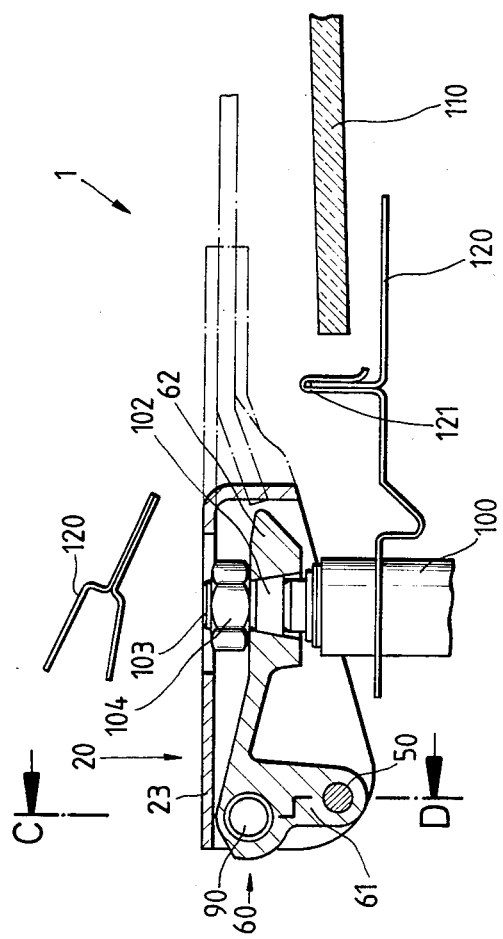
FIG. 6 is a cross sectional side view of the wiper arm according to FIG. 5, its fastening means on the wiper shaft and its position in a vehicle body.

The windshield wiper assembly shown in sections in FIGS. 5 to 7 includes a wiper arm 1, which consists of a wiper rod 10 of the construction as described in the preceding example and of a link 20 developed as an asymmetric hollow sheet steel body which is open on one side. It has a center portion 23 and two side walls 21, 22.

One sidewall 22 extends in almost a straight line towards the wiper rod 10 and the other sidewall 21 extends in a curved arc. The sidewalls embrace rod 10 in a form-fit manner by means of bent lugs 21a and 22a. As seen in FIG. 5, the link 20 has almost the shape of a reversed "h." A helical spring 30 is arranged in alignment with the center line of the wiper rod 10. Spring 30 engages the rear portion 12 of the wiper rod 10 with a first hook 31 and engages a suspension pin 50 with a second hook 32. As FIG. 7 shows, the suspension pin 50 is developed as a hollow rivet which with its major part is supported in a stepped bore 80 of the fastening member 60 and on one end is secured in the fastening member by means of an expansion 51. The other end is developed as a rivet head 52 in front of which the helical spring 30 engages with its hook 32.

FIGS. 5 and 6 best show that the fastening member consists of a diecasting lump 61 which is arranged at a right angle relative to the wiper rod 10 and to the helical spring 30 and is almost entirely covered by the link 20. The lump 61 has a lateral elongation 62 extending in parallel to the helical spring 30. Elongation 62 extends approximately as far as the front point of support 13 of the helical spring 30. The end third of elongation 62 is provided with a bore 70 for receiving the wiper shaft 100 and thereafter ends in a portion 66 which is inclined towards the center portion 23 of the link 20 as is clearly evident from FIG. 5, the helical spring 30 extends substantially in the longitudinal direction of the wiper rod 10 and is positioned laterally staggered relative to the bore 70 such that the center line of spring 30 is spaced from the axis of bore 70 by a distance greater then the radius of bore 70 (or shaft position 101) plus the outside radius of the spring 30.

The wiper shaft 100 consists of a straight part 101, which outside of the vehicle ends in a tapered portion 102 and a cylindrical threaded portion 103 on which the elongation 62 is secured by means of a nut 104.

The portion of the center portion of the link 20 arranged above spring 30 is inclined in accordance with the angle of inclination of the spring 30 as the line designated by 23a in FIGS. 5 and 7 indicates. This makes bore 90 easily accessible. Bore 90 is arranged above and behind the point of support 80 of the hollow rivet 50. In bore 90 is a bushing 91 for receiving a joint rivet 92. The link 20 can be swivelled around rivet 92 away from the windshield 110 by an angle of about 30° without the spring 30 and the wiper shaft 100 or its fastening means 104 affecting one another.

To facilitate the mounting of the wiper arm 1 on the wiper shaft 100, pin 53 is provided. Pin 53 is driven through a bore 21b in one side wall 21 of the link 20 into the broader part of the stepped bore 80. This pin keeps the wiper arm in such a position when it is mounted, that it can touch the windshield only slightly or not at all. Thereafter the pin 53 is removed, so that the wiper blade can rest against the windshield with the desired contact pressure produced by the wiper arm.

As can be seen from FIG. 6, the link 20 is almost entirely positioned in the interior of the vehicle body 120, when the windshield wiper installation is operated. The link is in particular very low in the critical area determined by the rim 121 for the windshield 110, so that the wiper arm cannot be hindered or damaged by the vehicle body. The wiper arm 1 has enough spacing from the vehicle body in any position.

FIGS. 8 and 9 show a further advantageous windshield wiper installation according to the invention. In this version the wiper rod 10 is held by a link 20 having a center line at an angle of about 48° from the center line of the wiper rod 10. In this version the contact pressure is produced by means of two helical springs 30, 30a which are arranged in parallel to each other in the link 20 to the left and to the right of a bore 70 for a wiper shaft 100. By providing two springs for the production of the contact pressure it is possible to use helical springs made from the thinner wire and with a smaller diameter of the windings which advantageously affects the overall height of the link.

The springs 30, 30a with their front hooks 31, 31a act upon a suspension pin 55 which is developed as a rivet and has two circumferential notches 56, 56a for keeping the springs in the right position in the points of support. Rivet 55 is secured on the one side by a rivet head 57 and on the other side by a flange 58 in the wiper arm link 20. The helical springs 30, 30a via their rear hooks 32, 32a act upon the suspension pins 50. Pins 50 should preferably be developed as fitting pins, of which one or two can be used as desired. The wiper shaft 100 is arranged between the two springs 30, 31a close to their front point of support 51. It is also possible to tilt the wiper arm without the springs 30, 30a being affected by the wiper shaft.

This embodiment provides a very flat wiper arm which is especially low in the critical area 121 of the vehicle body 120.

What is claimed is:

1. A windshield wiper assembly comprising:
    a wiper rod for carrying a wiper blade;
    a fastening member having a bore for receiving a wiper shaft;
    a link articulated on said fastening member, said link comprising a hollow member having two side walls and a center portion connecting said side walls;
    a helical compression spring disposed within said hollow member and extending substantially in the longitudinal direction of said wiper rod, said helical compression spring having one end coupled to said wiper rod;
    a yoke coupled to said fastening member for supporting the other end of said spring on said fastening member; wherein
    said helical compression spring is positioned laterally staggered relative to said bore such that the center line of said spring is spaced apart from the longitudinal axis of said bore at a distance greater than the radius of said wiper shaft; and
    said longitudinal axis intersects an imaginary line parallel to said wiper rod at a point between said one end of said helical compression spring and the point of support of said element on said fastening member.

2. A windshield wiper according to claim 1, wherein said distance is greater than the sum of the radius of said wiper shaft and the outside radius of said helical compression spring.

3. A windshield wiper according to claim 2, wherein said fastening member comprises a lateral elongation and said lateral elongation includes said bore.

4. A windshield wiper according to claim 1, wherein said wiper shaft is positioned substantially in line with said one end.

5. A windshield wiper according to claim 1, wherein said link is articulated to the end of said fastening member not facing said wiper rod.

6. A windshield wiper according to claim 5, wherein said link substantially covers said fastening member.

7. A windshield wiper installation according to claim 2, wherein: said longitudinal axis intersects an imaginary line parallel to said wiper rod at a point between said one end of said helical compression spring and the point of support of the yoke on said fastening member;
    said link is articulated to the end of said fastening member not facing said wiper rod;
    said fastening member comprises a lateral elongation and said lateral elongation includes said bore; and
    said lateral elongation extends beside said link.

8. A windshield wiper according to claim 7, wherein said lateral elongation has a smaller height adjacent the area where said link is articulated to said fastening member than in the region adjacent said bore.

9. A windshield wiper according to claims 1 or 2, wherein said link is formed symmetrically having a center line forming an angle of about 48° with the center line of said wiper rod, said wiper further comprising a second helical spring arranged in parallel to said helical spring on the opposite side of said bore, a first suspension pin secured in said link; and a second suspension pin on said fastening member; said helical springs being supported between said first and second suspension pins.

10. A windshield wiper according to claim 9, wherein said first suspension pin is a rivet having two circumferential notches each adapted for holding one of said springs in position.

11. A windshield wiper assembly comprising:
    a wiper rod for carrying a wiper blade;
    a fastening member comprising a lateral elongation including a bore for receiving a wiper shaft;
    an asymmetrically formed link articulated on said fastening member, said link comprising a hollow member having two side walls and a center portion connecting said side walls;
    a helical compression spring disposed within said hollow member and coupled at one end to said wiper rod;
    a yoke coupled to said fastening member for supporting the other end of said spring on said fastening member and; wherein said helical compression spring is positioned laterally staggered relative to said bore such that the center line of said spring is spaced apart from the longitudinal axis of said bore at a distance greater then the sum of the radius of said wiper shaft and the outside radius of said helical compression spring; and
    wherein said wiper rod and said helical spring are arranged alongside one of said side walls wherein said helical spring directly acts upon said wiper rod and acts on said fastening member via a suspension pin, and said lateral elongation extends parallel to said helical spring.

12. A windshield wipper according to claim 11, wherein said suspension pin is a hollow rivet supported in a stepped hole of said fastening member having a rivet head on its one end, in front of which said helical spring is coupled and on its other end is secured in the fastening member through a recess.

* * * * *